(12) United States Patent
Chang et al.

(10) Patent No.: US 8,446,963 B2
(45) Date of Patent: May 21, 2013

(54) METHOD AND SYSTEM FOR SYNCHRONIZING AUDIO AND VIDEO DATA SIGNALS

(75) Inventors: Pei-Chen Chang, Hsinchu (TW); Chien-Hao Chen, Taipei (TW)

(73) Assignee: MediaTek Inc., Science-Based Industrial Park, Hsin-Chu, Hsien (TW)

( * ) Notice: Subject to any disclaimer, the term of this patent is extended or adjusted under 35 U.S.C. 154(b) by 1600 days.

(21) Appl. No.: 11/456,860

(22) Filed: Jul. 12, 2006

(65) Prior Publication Data
US 2008/0013918 A1    Jan. 17, 2008

(51) Int. Cl.
*H04N 7/12* (2006.01)
*H04J 3/06* (2006.01)

(52) U.S. Cl.
USPC ..................................... 375/240.28; 370/503

(58) Field of Classification Search
USPC ..................................... 375/240.28; 370/503
See application file for complete search history.

(56) References Cited

U.S. PATENT DOCUMENTS

| | | | |
|---|---|---|---|
| 2005/0201733 A1* | 9/2005 | Chiu et al. | 386/96 |
| 2005/0238059 A1* | 10/2005 | Lundblad et al. | 370/503 |
| 2006/0146850 A1* | 7/2006 | Virdi et al. | 370/412 |

* cited by examiner

*Primary Examiner* — Richard Torrente
(74) *Attorney, Agent, or Firm* — Winston Hsu; Scott Margo (57) ABSTRACT

A system for synchronizing video data and audio data for an optical disc is disclosed. The system includes a demultiplexer, for splitting a data stream into audio data and video data, the audio data having an embedded/associated audio playback time information and the video data having an embedded/associated video playback time information; an audio decoding block, having at least fast forward or slow forward functionality, for decoding the audio data to output decoded audio data; a video decoding block, having at least fast forward or slow forward functionality, for decoding the video data to output decoded video data; and a decision block, for sending at least an adjustment signal, wherein the adjustment signal is for instructing either the video decoding block or the audio decoding block to perform fast forward or slow forward operations.

9 Claims, 10 Drawing Sheets

METHOD AND SYSTEM FOR SYNCHRONIZING AUDIO AND VIDEO DATA SIGNALS

BACKGROUND

The present invention relates to audio and video synchronization, and more particularly, to synchronizing audio and video data signals by selectively adjusting the video data and the audio data utilizing pre-existing fast and slow forward functions.

Multimedia playback systems, such as DVD players, process both audio and video signals from an optical disc to display audio-visual data. When the transmission of these signals is not synchronized, a sync problem occurs, resulting in either the dialogue preceding the action, or the action preceding the dialogue. When the sync error is small, the effect is negligible; when the sync error is large, however, the effect is significant, and may render the optical disc impossible to watch.

An important feature of multimedia playback systems, therefore, is the ability to re-synchronize the audio and video signals once a sync error is detected. A conventional method is to utilize one stream as the control to either skip or pause data of the other stream in order to achieve synchronization. More clearly, if the audio stream is taken as the control stream and the video stream lags the audio stream (i.e. the dialogue precedes the action), several frames of the video stream will be skipped in order to catch up the audio stream. If, on the other hand, the audio stream is taken as the control stream and the audio stream lags the video stream (i.e. the action precedes the dialogue), a frame of the video stream will be paused to allow the audio stream to catch up.

If the sync error is large, many frames will have to be skipped, or a frame will have to be paused for a significant amount of time, which will be noticeable by the user. This situation is less than ideal.

SUMMARY

It is therefore an objective of the present invention to provide a system and method for synchronizing audio and video streams to solve the above problems.

Briefly described, a first embodiment of the system comprises: a demultiplexer, for splitting a data stream into audio data and video data, wherein the audio data has an embedded/associated audio playback time information and the video data has an embedded/associated video playback time information; an audio decoding block, having at least fast forward or slow forward functionality, for decoding the audio data to output decoded audio data; a video decoding block, having at least fast forward or slow forward functionality, for decoding the video data to output decoded video data; and a decision block, coupled to at least one of the audio and video decoding blocks. The decision block compares at least one of the video playback time information and the audio playback time information, with a determined value of the system, and utilizes the comparison result to send at least an adjustment signal for setting either the video encoding block or the audio encoding block, wherein the adjustment signal is for instructing either the video decoding block or the audio decoding block to perform fast forward or slow forward operations.

A method for synchronizing the data streams is also disclosed. The method comprises: splitting a data stream into audio data and video data, the audio data having an embedded/associated audio playback time information and the video data having an embedded/associated video playback time information; comparing at least one of the video playback time information and the audio playback time information with a determined value of the system; utilizing the comparison result to send at least an adjustment signal; utilizing the adjustment signal for adjusting either the audio data or video data; and decoding the audio data and video data wherein the adjustment signal is for fast forwarding or slow forwarding either the video data or the audio data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
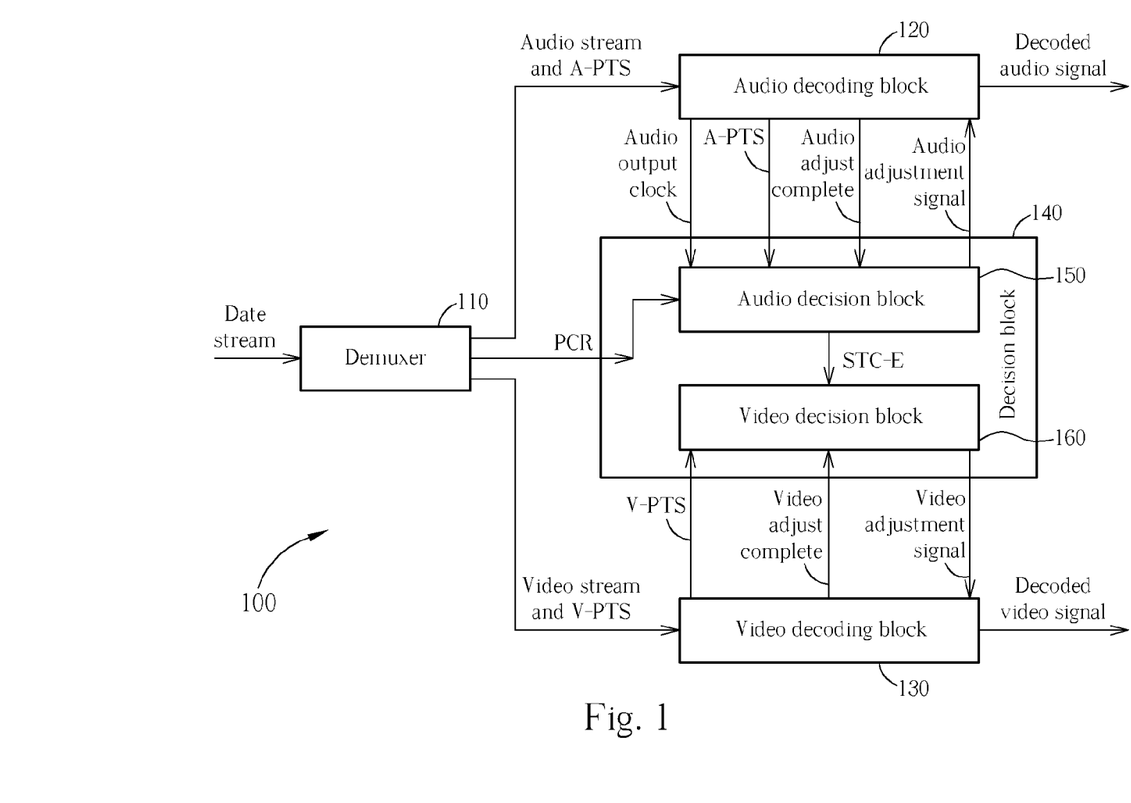
FIG. 1 is a diagram of a system according to a first embodiment of the present invention.

FIG. 1 is a diagram of a multimedia playback system 100 according to a first embodiment of the present invention. The system 100 shown in FIG. 1 comprises a demultiplexer (demux) 110, for receiving a data stream and splitting the stream into audio data and video data. The demux 110 is coupled to an audio decoding block 120 having at least fast forward or slow forward functionality. The demux 110 is further coupled to a video decoding block 130 having at least fast forward or slow forward functionality. The demux 110, the audio decoding block 120, and the video decoding block 130 are coupled to a decision block 140.

The audio data and video data respectively contain audio playback time information, called the audio presentation time stamp (A-PTS) and video playback time information, called the video presentation time stamp (V-PTS). The decision block 140 compares both the A-PTS and the V-PTS with a determined value of the system 100, and utilizes the comparison result to set an audio adjustment signal for setting the audio encoding block 120 and a video adjustment signal for setting the video encoding block 130. The adjustment signals are for instructing the video decoding block 130 and/or the audio decoding block 120 to perform fast forward or slow forward operation. Please note that, in the following embodiments, both the audio encoding block 120 and the video decoding block 130 have slow forward and fast forward functionality. This is not a limitation of the present invention, however, and it is possible that each block has various combinations of fast forward and slow forward functionality. The various possible embodiments are detailed below:

1) Audio decoding block has fast forward and slow forward functionality, and video decoding block only has fast forward functionality.

2) Audio decoding block has fast forward and slow forward functionality, and video decoding block only has slow forward functionality.

3) Video decoding block has fast forward and slow forward functionality, and audio decoding block only has fast forward functionality.

4) Video decoding block has fast forward and slow forward functionality, and audio decoding block only has slow forward functionality.

5) Audio decoding block only has fast forward functionality, and video decoding block only has fast forward functionality.

6) Audio decoding block only has slow forward functionality, and video decoding block only has slow forward functionality.

In FIG. 1 the determined value of the system 100 is obtained by utilizing a program clock reference (PCR). The decision block 140 further comprises an audio decision block 150 and a video decision block 160. The audio decision block 150 and the video decision block 160 both obtain the PCR directly and the audio decision block 150 utilizes an audio clock in the audio decoding block 120 to clock the PCR. In this embodiment, the PCR of bit 41~bit 9 is utilized for correction of the system time clock (STC). The audio decision block 150 then compares the PCR with the A-PTS and determines if a relation between the two values is greater than a determined value. If the inequality is true, the audio decision block 150 will calculate an adjustment signal and output it to the audio decoding block 120. The audio decision block 150 also utilizes the sampled PCR and the audio clock to create a new reference source clock STC-E for determining the video adjustment signal. An exemplary new reference source clock STC-E is calculated from the following equation when the STC rate is 90 KHz:

$$STC - E = PCR_{sampled}(bit41 \sim bit9) + \frac{rate_{STC}}{f_s} \times delta_{audio\ output}$$

where STC-E represents the determined value, $rate_{STC}$ represents the STC rate, $f_s$ represents an audio output sampling frequency, and $delta_{audio\ output}$ represents the number of audio samples sent after $PCR_{sampled}$.

The video decision block 160 then compares the V-PTS with the STC-E for obtaining a video adjustment signal that is then output to the video decoding block 130. Once the audio decoding block 120 and the video decoding block 130 receive the adjustment signals they will respectively decode audio and video streams by fast forwarding or slow forwarding according to the adjustment signals. The audio decision block 150 and video decision block 160 then output an audio adjust complete and a video adjust complete signal to report to the decision block 140.

Figure 2:
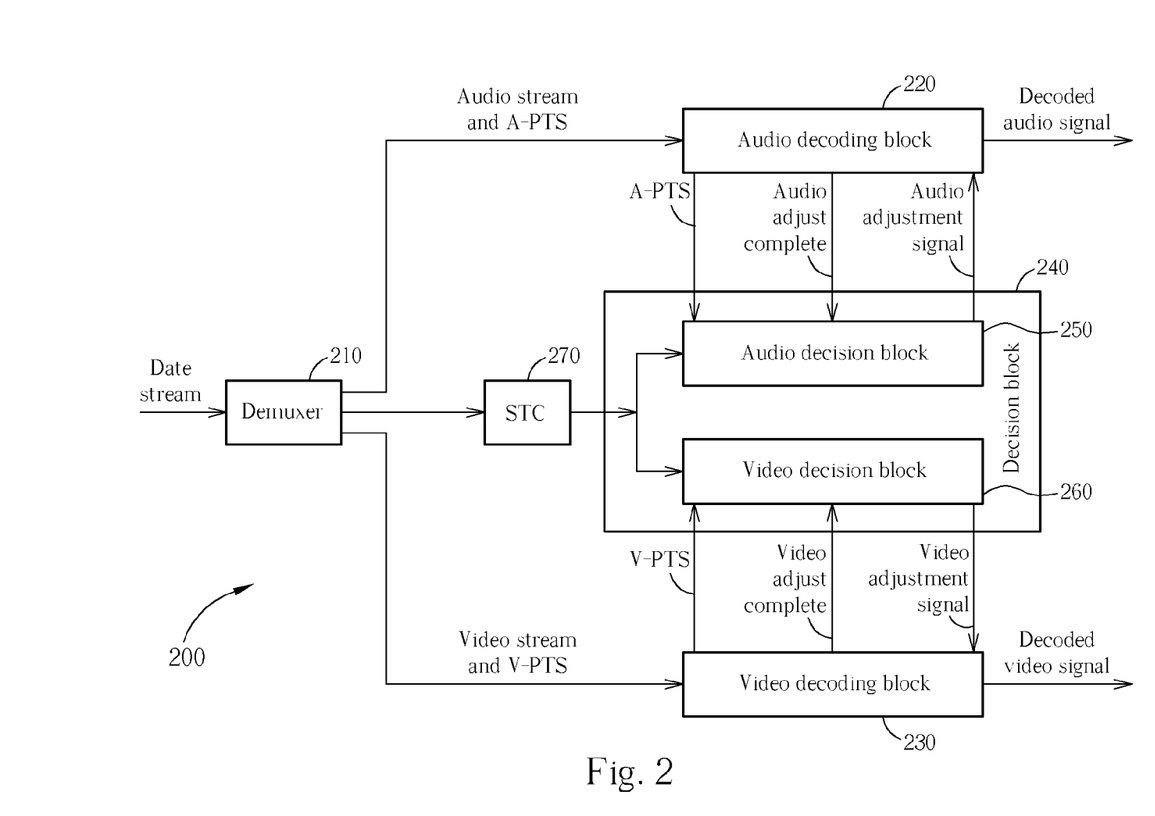
FIG. 2 is a diagram of a system according to a second embodiment of the present invention.

FIG. 2 is a diagram of a system 200 according to a second embodiment of the present invention. The system 200 comprises a system time clock (STC) 270. The PCR, or a System Clock Reference (SCR) is clocked by the STC 270, thereby updating the STC 270. The audio decision block 250 then compares the updated STC with the A-PTS and the video decision block 260 compares the updated STC with the V-PTS to determine if a relation between the STC and the PTS is above a certain determined threshold, wherein the threshold can be related to input buffer size or output buffer size of the audio decoding block 220 and video decoding block 230 respectively. If this inequality is found to be true, the decision block 240 will utilize the PTS and the STC to determine adjustment signals, for selectively fast forwarding or slow forwarding the audio stream and/or the video stream. Once the audio decoding block 220 and the video decoding block 230 have respectively adjusted the audio stream and the video stream, they each send a recognition signal to the decision block 240.

An exemplary audio adjustment signal is determined by the following equation when the decoding rate is 48 KHz and the frequency of the STC is 90 KHz:

$$\text{Audio adjustment factor} = \frac{(STC - PTS_{audio}) \times freq_{decode}}{rate_{STC} \times N},$$

where $PTS_{audio}$ represents the audio playback time information, $freq_{decode}$ represents the audio decoding sampling frequency, $rate_{STC}$ represents the STC rate, and N represents a least sample number for fast forward or slow forward operations.

The audio adjustment signal can also be determined by the following equation:

$$\text{Audio adjustment factor} = \frac{(STC - PTS_{audio}) \times freq_{decode}}{rate_{STC} \times N_f},$$

where $PTS_{audio}$ represents the audio playback time information, $freq_{decode}$ represents the decoding frequency, $rate_{STC}$ represents the STC rate, and $N_f$ represents samples decoded of one frame.

An exemplary video adjustment signal is determined by the following equation when the video decoding rate is 30 frames per second:

$$\text{Video adjustment factor} = \frac{(STC - PTS_{video}) \times rate_{decode}}{rate_{STC} \times N_v},$$

where $PTS_{video}$ represents the video playback time information, $rate_{decode}$ represents the video decoding frame rate, $rate_{STC}$ represents the STC rate, and $N_v$ represents a least frame number for fast forward or slow forward operations.

An advantage of some embodiments of the present invention is that the decoding blocks can separately fast forward or slow forward the data according to the adjustment factor. Therefore, if the sync error is significantly large, rather than fast forwarding one data stream and creating a noticeable 'jump' in transmission, one data stream can be fast forwarded and one data stream can be slow forwarded, to make the effect less significant.

A further advantage of some embodiments of the present invention is that either decoding block (i.e. the audio decoding block or the video decoding block) can perform the fast forward/slow forward processes, thereby having greater flexibility.

Figure 3:
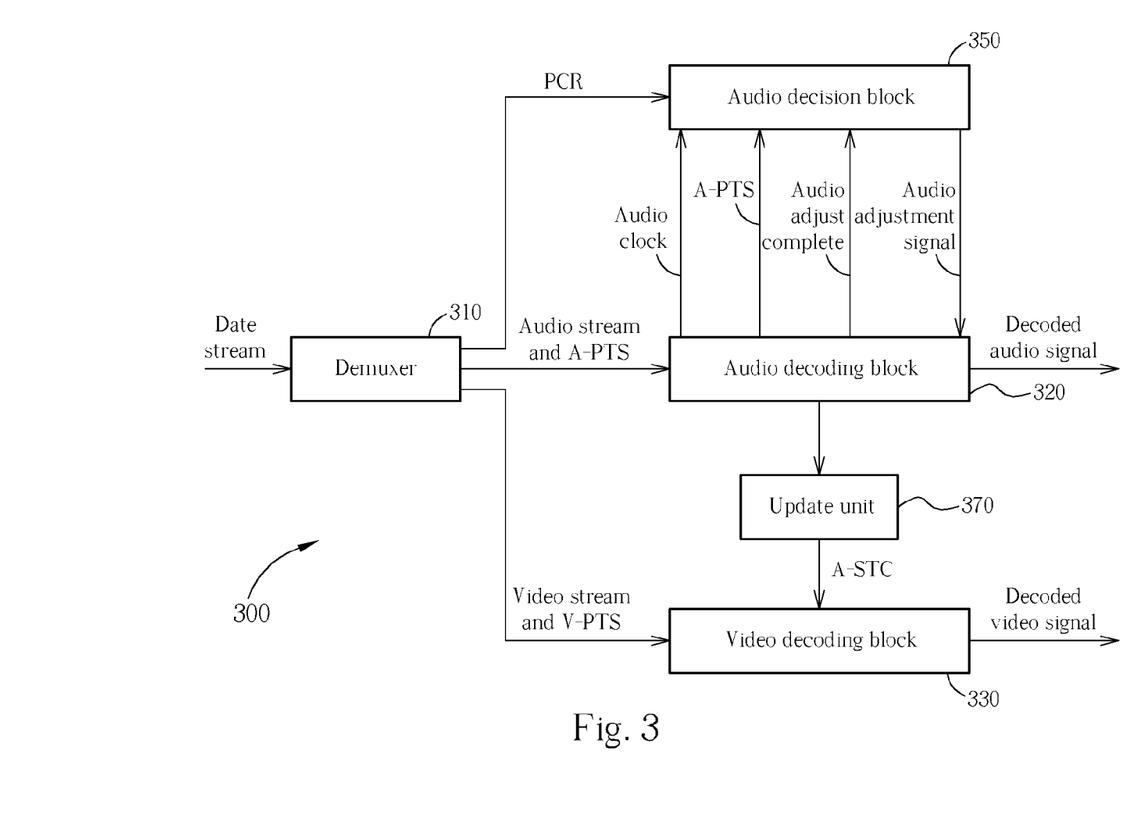
FIG. 3 is a diagram of a system according to a third embodiment of the present invention.

FIG. 3 is a diagram of a third embodiment of the system 300 according to the present invention. In FIG. 3, the desired decision block is only implemented by an audio decision block 350 for adjusting the audio stream. The adjusted audio stream is then utilized to calibrate the video stream by updating A-STC (audio system time clock) based on A-PTS (audio presentation time stamp), and providing the A-STC to the video decoding block 330 as reference. In a situation where the audio stream lags the video stream by a significant amount, the audio decision block 350 can determine to fast forward the audio stream by half the number of frames the audio stream lags by, and then utilize the audio stream timing to slow forward the video stream by the remaining half of the frames. In this way, a large sync error can be made less noticeable to the user. Please note that the principle involved in this embodiment is the same as in the above two embodiments. The difference is that the audio decision block 350 only controls the audio stream timing directly, and the audio decoding block 320 then controls the video stream timing. The utilization of the audio decoding block 320 to calibrate the video decoding block 330 is merely one embodiment of the present invention, and is not a limitation.

In FIG. 3, the demux 310 extracts program clock reference (PCR), which is sent to the audio decision block 350, an audio stream sent to the audio decoding block 320, and a video stream sent to the video decoding block 330. The audio decoding block 320 receives the A-PTS and sends it to the audio decision block 350. The audio decision block 350 receives the PCR, compares the A-PTS with the PCR and utilizes the comparison result to send an adjustment signal to the audio decoding block 320. The adjustment signal is then utilized to update an audio system time clock (A-STC), which is in turn utilized for calibrating the video decoding block 330. The equation for updating the audio system time clock 370 used by the update unit 370 is the same as that utilized in the embodiment shown in FIG. 2.

Figure 4:
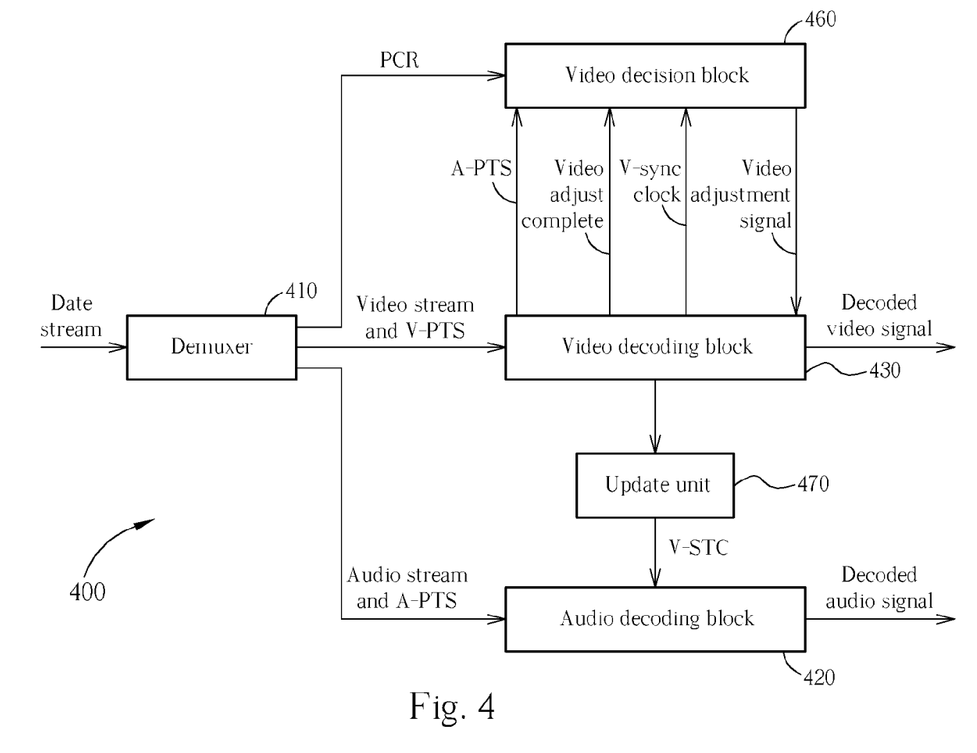
FIG. 4 is a diagram of a system according to a fourth embodiment of the present invention.

FIG. 4 is a diagram of system 400 according to a fourth embodiment of the present invention. This embodiment is largely similar to the embodiment in FIG. 3, except in this embodiment the decision block is only implemented by a video decision block 460 for adjusting the video stream, and the adjusted video stream is then utilized to calibrate the audio stream. In this embodiment the PCR and a video-sync clock and the PCR is then utilized to update a video system time clock (V-STC), which is utilized to calibrate the audio stream. An exemplary equation for updating the V-STC performed in the update unit 470 is as follows:

$$STC_{extra-v} = PCR_{sampled}(bit41 \sim bit9) + \frac{90000 \times delta_{v-sync}}{C_{v-sync}}$$

where $C_{v-sync}$=v-sync clock (video field output clock); and $delta_{v-sync}$=number of fields update after PCR sampled.

As the operation of this embodiment can be clearly understood by referring to FIG. 4 together with the description of the third embodiment, further detail is omitted for brevity.

Figure 5:
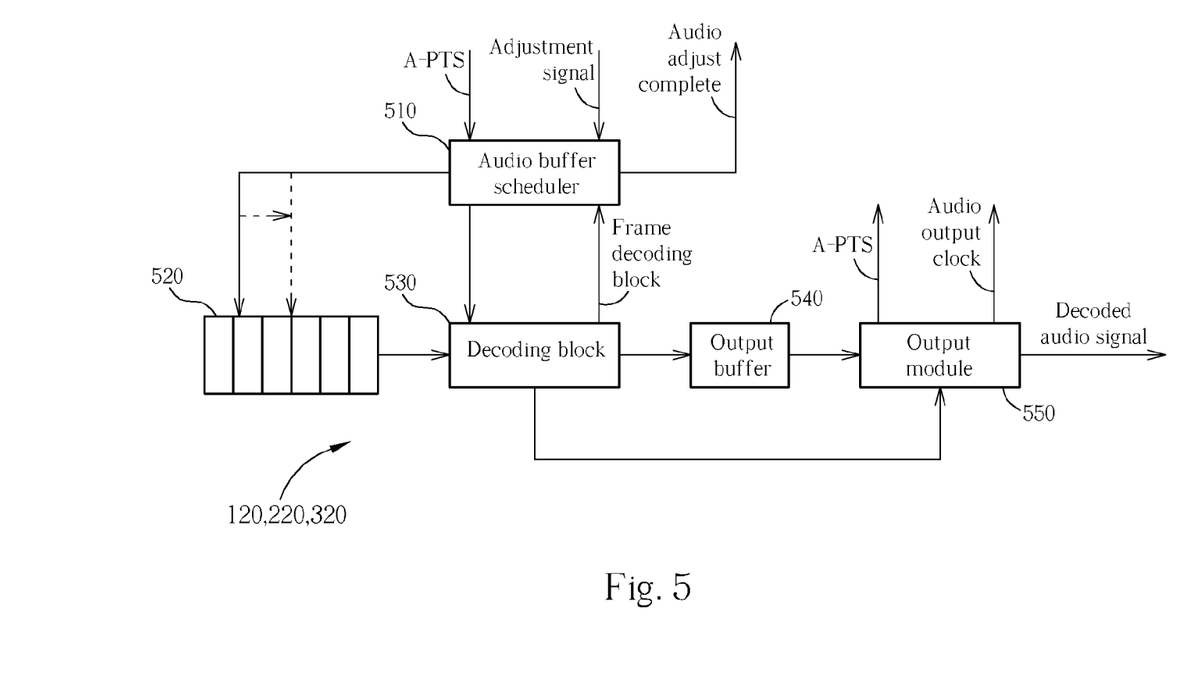
FIG. 5 is a diagram of a first embodiment of an audio decoding block.

The slow forward and fast forward operations will now be described in more detail. An advantage of the present invention is that it utilizes the existing fast and slow forward functions of a standard player to achieve the audio/video synchronization goal. This therefore negates the need for complicated circuitry or execution codes. FIG. 5 is a diagram of a first embodiment of the audio decoding block 120, 220, 320. The audio decoding block 120, 220, 320 comprises: an input buffer 520; an output buffer 540; an audio buffer scheduler 510; a decoding block 530; and an output module 550. The audio adjustment signal and the A-PTS are sent to the audio buffer scheduler 510. The audio buffer scheduler 510 sets a pointer to indicate which blocks of the input buffer 520 should be sent to the decoding block 530. The decoding block 530 further receives A-PTS information from the audio buffer scheduler. If the audio data precedes the video data, a slow forward operation needs to occur. In this case, the pointer is latched at a certain block, and no more blocks are sent to the decoding block 530 until instructed by the audio buffer scheduler 510. If the audio data lags the video data, a fast forward operation needs to occur. In this case, the pointer is moved ahead a certain number of blocks, and the currently indicated block is sent to the decoding block 530. The blocks in between will not be sent to the decoding block 530. In this way, data can be fast forwarded or slow forwarded. The decoding block 530 sends a decoding complete signal to the audio buffer scheduler 510 after each frame of audio data is decoded. Decoded frames are then sent to the output buffer 540, and then to the output module 550 for being output as the decoded audio signal. The decoding block 530 also sends A-PTS information to the output module 550. The output module 550 optionally passes an audio output clock along with the A-PTS to the audio decision block.

Figure 6:
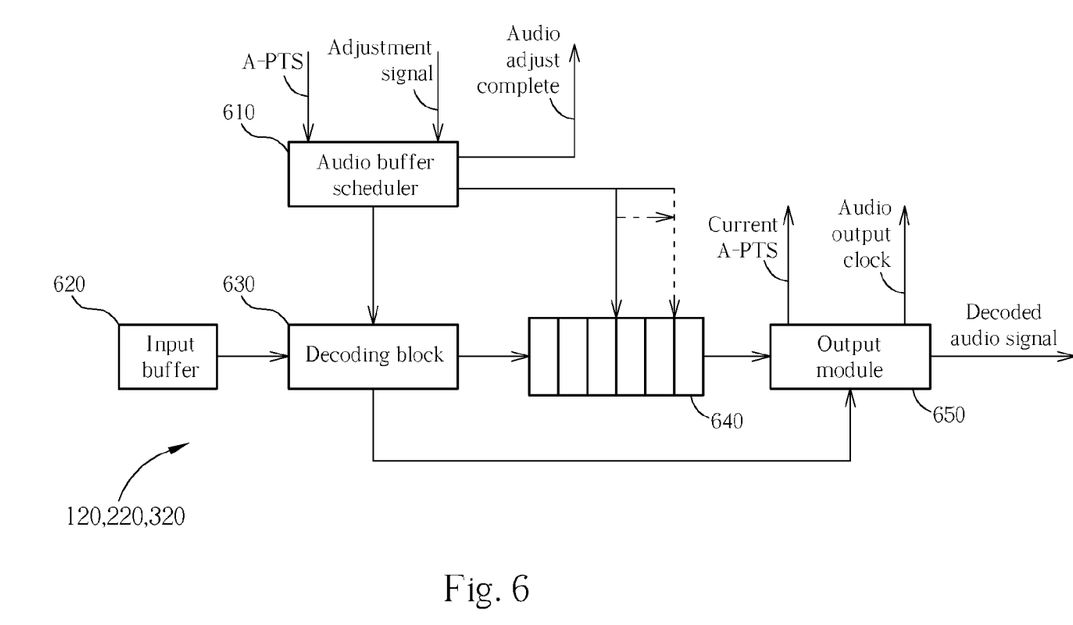
FIG. 6 is a diagram of a second embodiment of the audio decoding block.

FIG. 6 is a diagram of a second embodiment of the audio decoding block 120, 220, 320. The second embodiment comprises the same components as the first embodiment; however, in this embodiment, the audio buffer scheduler 610 sets a pointer to indicate which blocks in the output buffer 640 should be sent to the output module 650. All blocks in the input buffer 620 are sent to the decoding block 630, decoded and sent to the output buffer 640. The output buffer 640 receives a signal from the audio buffer scheduler 610. If the audio data precedes the video data, a slow forward operation needs to be performed. In this case, the pointer is latched at a certain block, and only released after an instruction by the audio buffer scheduler 610. At this point, blocks buffered in the output buffer 640 are sent to the output module 650. If the audio data lags the video data, a fast forward operation needs to be performed. The pointer is moved forward a certain number of blocks, and the block currently indicated by the pointer will be sent to the output module 650. The previous blocks will not be sent to the output module 650.

Figure 7:
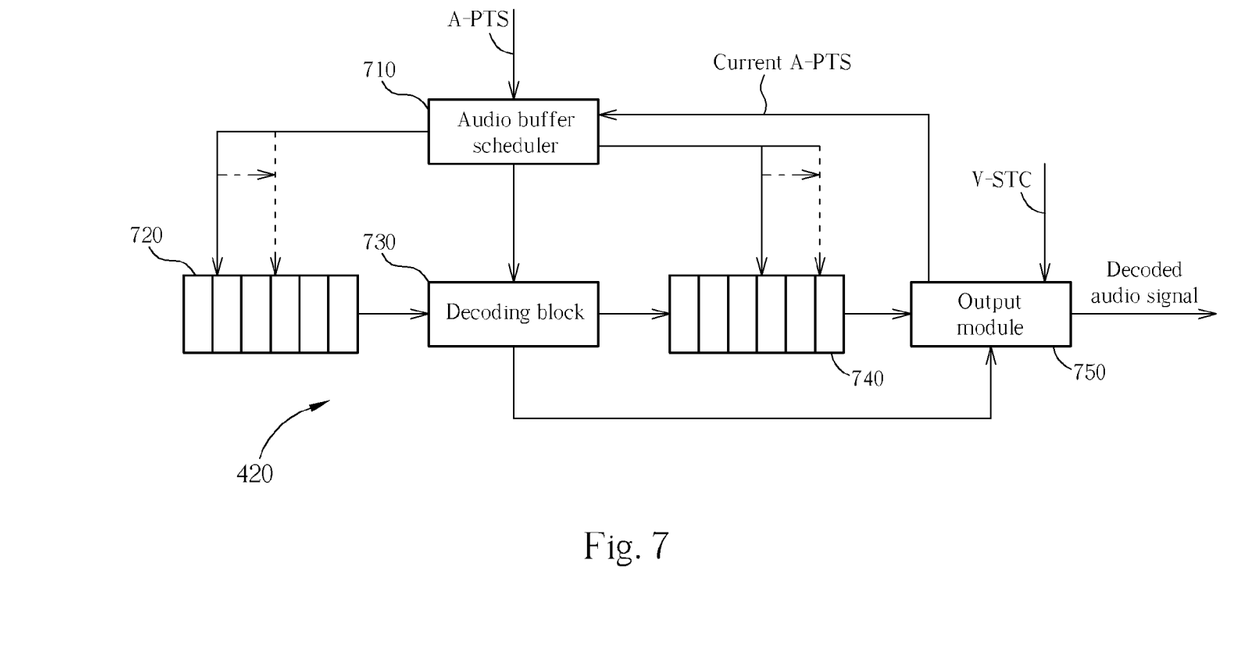
FIG. 7 is a diagram of a third embodiment of the audio decoding block.

Please refer to FIG. 7 and FIG. 4. FIG. 7 is a diagram of a third embodiment of the audio decoding block. Please note that this embodiment corresponds to the audio decoding block 420 of the system 400 detailed in FIG. 4. The A-PTS is sent to the audio buffer scheduler 710, which sets a pointer for determining which blocks in the input buffer 720 will be sent to the decoding block 730. The decoding block 730 decodes the blocks and sends them to the output buffer 740. The audio buffer scheduler 710 sets a second pointer for determining which blocks in the output buffer 740 will be sent to the output module 750. The output module receives V-STC from the update unit 470 shown in FIG. 4, and sends an adjusted A-PTS (the A-PTS corresponding to the current audio output) to the audio buffer scheduler 710.

Figure 8:
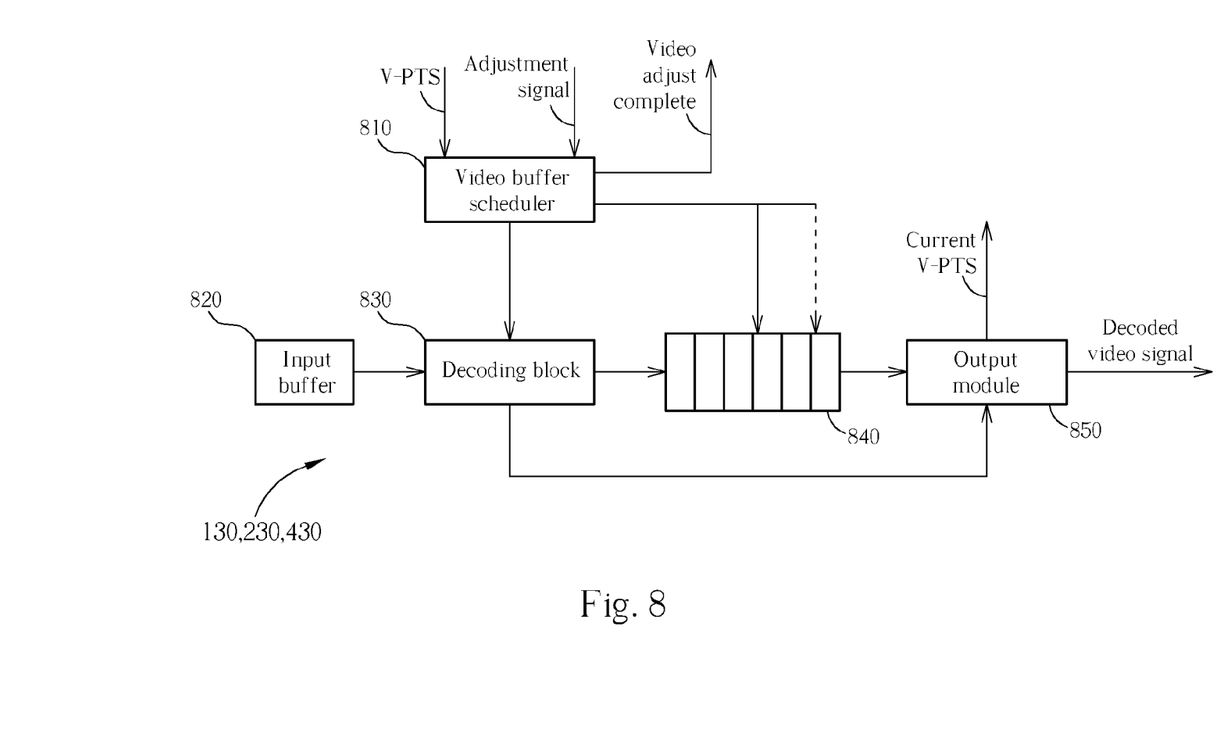
FIG. 8 is a diagram of a first embodiment of a video decoding block.

FIG. 8 is a diagram of a first embodiment of the video decoding block Please note that this embodiment corresponds to the video decoding block 130, 230, 430. The operation of the video decoding block 130, 230, 430 is the same as the audio decoding block 120, 220, 320 shown in FIG. 6. The video decoding block 130, 230, 430 comprises: an input buffer 820; an output buffer 840; a video buffer scheduler 810; a decoding block 830; and an output module 850. The video buffer scheduler 810 sets a pointer for determining which blocks in the output buffer 840 will be sent to the output module 850. The operation of the video decoding block 130, 230, 430 is the same as the audio decoding block 120, 220, 320 shown in FIG. 6, and further description is therefore omitted for brevity.

Figure 9:
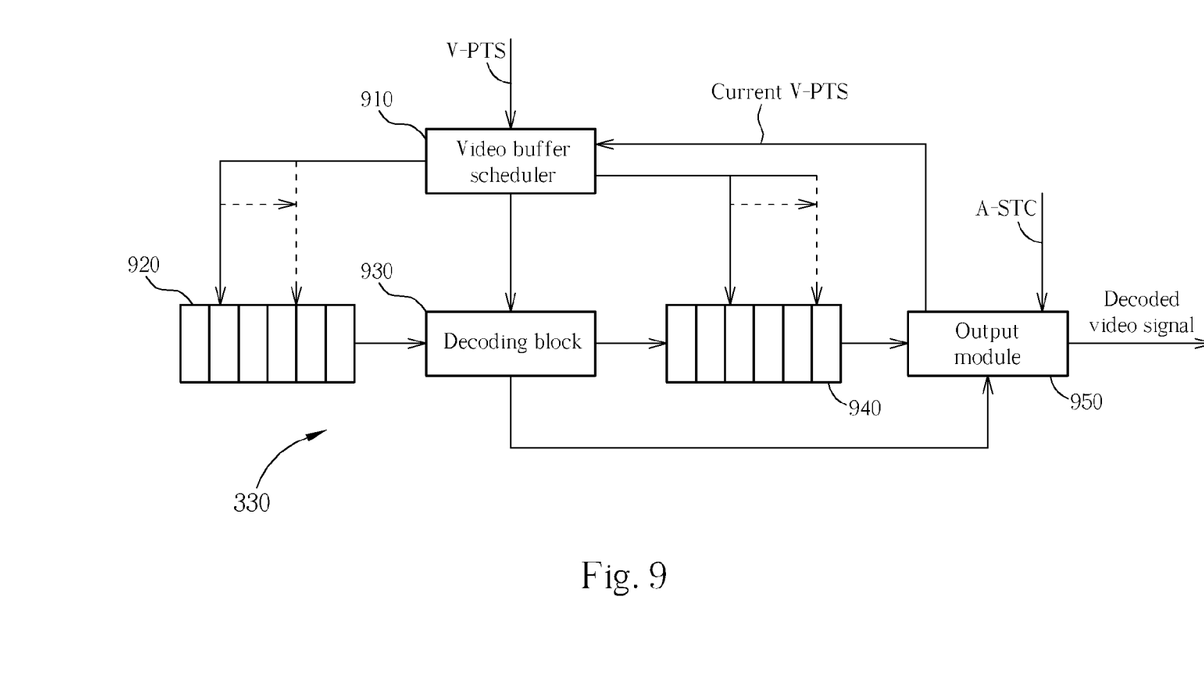
FIG. 9 is a diagram of a second embodiment of the video decoding block.

Please refer to FIG. 9 and FIG. 3. FIG. 9 is a diagram of a second embodiment of the video decoding block, corresponding to the video decoding block 330 shown in FIG. 3. The video decoding block 330 in FIG. 9 comprises the same components as the video decoding block 130, 230, 430 in FIG. 8, except that, in FIG. 9, the video buffer scheduler 910 sets a first pointer for indicating which blocks in the input buffer 920 will be sent to the decoding block 930, and sets a second pointer for determining which blocks in the output buffer 940 will be sent to the output module 950. The output module receives A-STC from the update unit 370 shown in FIG. 3, and utilizes the A-STC to send an adjusted V-PTS (the V-PTS corresponding to the current video output) to the video buffer scheduler 910.

Figure 10:
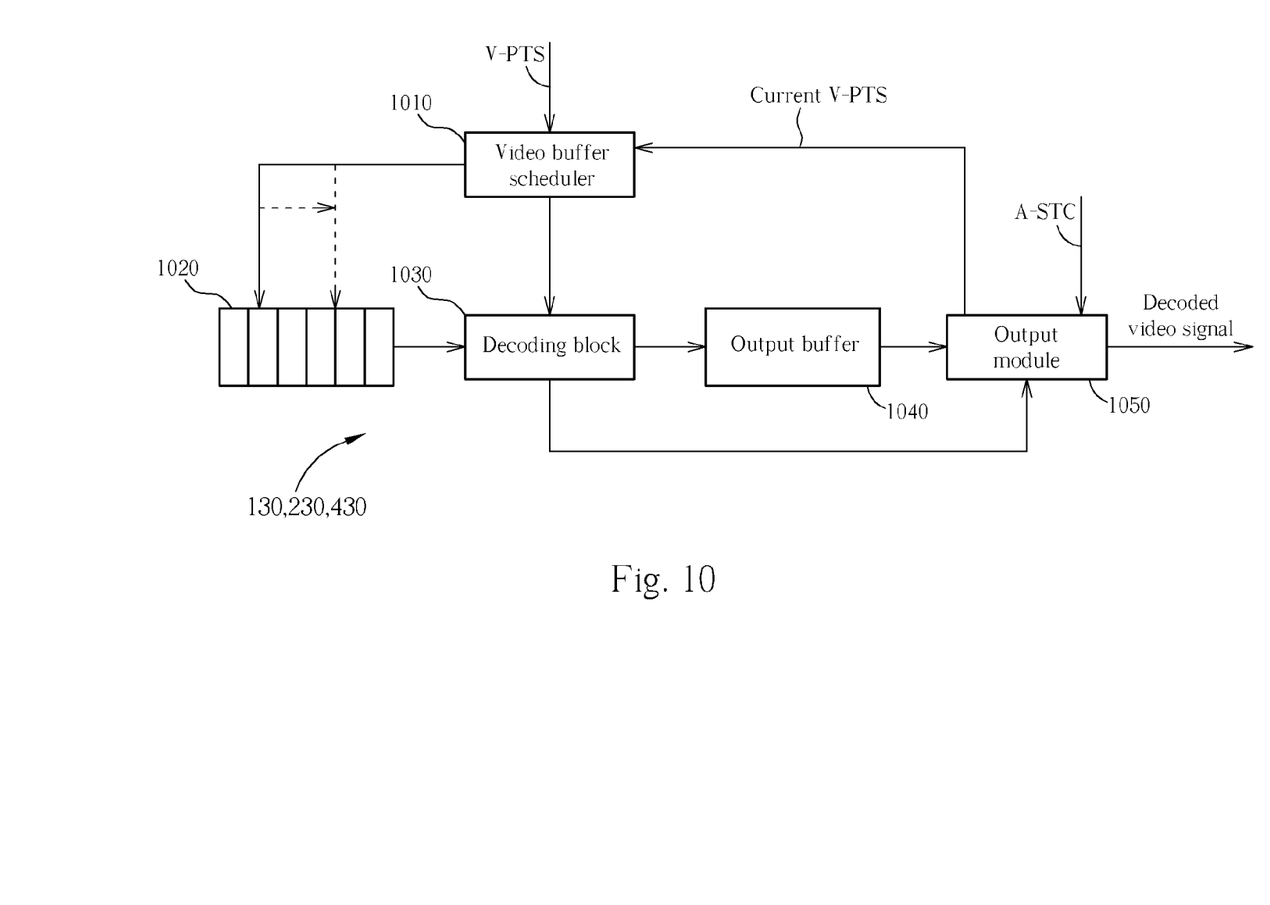
FIG. 10 is a diagram of a third embodiment of the video decoding block.

Please refer to FIG. 10. FIG. 10 is a diagram of a third embodiment of the video decoding block, corresponding to the video decoding block 130, 230, 430. The operation of the video decoding block 130, 230, 430 is the same as the audio decoding block 120, 220, 320 shown in FIG. 5. The video decoding block 130, 230, 430 comprises: an input buffer 1020; an output buffer 1040; a video buffer scheduler 1010; a decoding block 1030; and an output module 1050. The video buffer scheduler 1010 sets a pointer for determining which blocks in the input buffer 1020 will be sent to the decoding block 1030. The operation of the video decoding block 130, 230, 430 is the same as the audio decoding block 120, 220, 320 shown in FIG. 5, and further description is therefore omitted for brevity.

It is an advantage of the system that the video stream and audio stream can be separately adjusted to achieve synchronization of the data streams. It is a further advantage that the video stream and audio stream can be adjusted simultaneously in order to achieve the smoothest synchronization.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for synchronizing video data and audio data, the system comprising:
   a demultiplexer, for splitting a data stream into audio data and video data, wherein the audio data has an embedded/associated audio playback time information and the video data has an embedded/associated video playback time information;
   an audio decoding block, having at least fast forward or slow forward functionality, for decoding the audio data to output decoded audio data;
   a video decoding block, having at least fast forward or slow forward functionality, for decoding the video data to output decoded video data; and
   a decision block, coupled to the audio decoding block, for comparing the video playback time information with a determined value of the system, comparing the audio playback time information with the determined value of the system and utilizing the comparison result to generate an audio adjustment factor to the audio decoding block, wherein the audio adjustment factor is for instructing the audio decoding block to perform fast forward or slow forward operation, the decision block comprising:
   a video decision block and an audio decision block;
   wherein the audio decision block utilizes an audio clock to extract the determined value from the audio data, and determines the determined value utilizing the equation:

$$STC - E = PCR_{sampled}(bit41 \sim bit9) + \frac{rate_{STC}}{f_s} \times delta_{audio\ output},$$

where STC-E stands for System Time Clock-Extracted, PCR stands for Program Clock Reference, STC-E represents the determined value, $f_s$ represents an audio output sampling frequency, $rate_{STC}$ represents the rate of the STC, and $delta_{audio\ output}$ represents the number of audio samples sent after $PCR_{sampled}$.

2. The system of claim 1, wherein the video decoding block comprises:
   an input buffer, for buffering frames of the received video data;
   a decoding block, coupled to the input buffer, for decoding blocks of video data;
   an output buffer, coupled to the decoding block, for buffering decoded frames of the video data;
   an output module, coupled to the output buffer, for outputting blocks of video data buffered in the output buffer; and
   a video buffer scheduler, coupled to the input buffer and the decoding block, for setting a pointer to determine which blocks in the input buffer will be sent to the decoding block.

3. The system of claim 1, wherein the audio decoding block comprises:
   an input buffer, for buffering frames of the received audio data;
   a decoding block, coupled to the input buffer, for decoding blocks of audio data;
   an output buffer, coupled to the decoding block, for buffering decoded frames of the audio data;
   an output module, coupled to the output buffer, for outputting blocks of audio data buffered in the output buffer; and
   an audio buffer scheduler, coupled to the decoding block and the input buffer, for setting a pointer to determine which blocks in the input buffer will be sent to the decoding block.

4. The system of claim 1, wherein the decision block is coupled to both the video decoding block and the audio decoding block, and the comparison result further generates another adjustment signal for setting the video decoding block and for instructing the video decoding block to perform fast forward or slow forward operation.

5. The system of claim 1, wherein the decision block is coupled to both the video decoding block and the audio decoding block, and the decision block further compares the audio playback time information with the determined value of the system to generate an adjustment factor to the video decoding block.

6. A method for synchronizing video data and audio data, the method comprising:
   splitting a data stream into audio data and video data, the audio data having an embedded/associated audio playback time information and the video data having an embedded/associated video playback time information;
   comparing the video playback time information with a determined value of the system by utilizing an audio clock for extracting the determined value from the audio data, and the determined value is determined by utilizing the equation:

$$STC - E = PCR_{sampled}(bit41 \sim bit9) + \frac{rate_{STC}}{f_s} \times delta_{audio\ output},$$

where STC-E stands for System Time Clock-Extracted, PCR stands for Program Clock Reference, STC-E represents the determined value, $rate_{STC}$ represents the rate of the STC, $f_s$ represents an audio output sampling frequency, and $delta_{audio\ output}$ represents the number of audio samples sent after $PCR_{sampled}$;

comparing the audio playback time information with the determined value to generate an audio adjustment factor for the audio data;

decoding the audio data and video data;

wherein the audio adjustment factor is for instructing the audio decoding block to perform fast forward or slow forward operation.

7. The method of claim 6, wherein the step of the audio data and video data further comprises:

buffering the audio data and video data;

utilizing the audio adjustment factor to selectively perform fast forward or slow forward operations on the buffered audio data;

selectively decoding the audio data according to the performed fast forward and slow forward operations;

buffering the decoded frames; and outputting the decoded frames.

8. The method of claim 6, wherein the step of comparing the video playback time information with a determined value of the system further comprises:

utilizing the comparison result to generate another adjustment signal; and utilizing the adjustment signal for adjusting the video data;

wherein the adjustment signal is for fast forwarding or slow forwarding the video data.

9. The method of claim 6, further comprising:

comparing the audio playback time information with a determined value of the system;

utilizing the comparison result to send at least one adjustment signal;

utilizing the at least one adjustment signal for adjusting the video data; and decoding the audio data and video data;

wherein when the audio playback time information is compared with the determined value of the system, the at least one adjustment signal is for fast forwarding or slow forwarding the video data.

* * * * *